Figure 1:
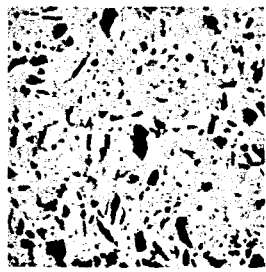

Dec. 15, 1953     H. O. KAUFFMANN ET AL     2,662,825
REFRACTORY
Filed June 5, 1948

INVENTOR
Hans O. Kauffmann and James F. Whalen, Jr.

BY Bean, Brooks, Buckley & Bean.
ATTORNEYS

Patented Dec. 15, 1953

2,662,825

UNITED STATES PATENT OFFICE 2,662,825

REFRACTORY

Hans O. Kauffmann, Eggertsville, and James F. Whalen, Jr., Kenmore, N. Y., assignors to Buffalo Electro-Chemical Company, Inc., Tonawanda, N. Y.

Application June 5, 1948, Serial No. 31,286

5 Claims. (Cl. 106—40)

The present invention relates to the manufacture of refractory products and more particularly to ceramic products containing a multitude of cavities or cells which render such products suitable for employment either as a sound-absorbing media or as improved heat-insulating media.

Refractory porous products have been made heretofore by incorporating combustible organic materials as, for instance, coke, sawdust, cork, resinous materials, and the like, in a slurry of materials which are capable of providing the desired refractory composition. After the slurry has been molded into desired shape for the resulting molded objects, the "green bonded" products are fired at a relatively low temperature to burn out and destructively distill off substantially all of the combustible material initially mixed with the slurry. In this fashion have been prepared refractory bricks having certain desired properties, as for instance, suitable resistance to crushing forces and having, due to the internal cavities, a weight constituting only 40 to 25% of the weight of a non-porous refractory. The porosity of the resultant brick results in desired physical properties, for instance, excellent heat-insulating qualities.

However, during the process of burning out the combustible material to form a cellular structure, the molded articles ordinarily tend to crack by reason of the fact that channels are produced in the article by the products of destructive distillation in order to escape from the interior to the exterior of the article. As a consequence, the production of faulty bricks or "seconds" in the manufacture of such brick is relatively high and, in general, homogeneity of the finished products is not of a desired high grade.

It is an object of the present invention to provide improved channel-free porous stony refractory articles in which the porous nature of the article is characterized by small uniformly distributed individual pores or cells. Our invention also comprises a method for fabricating such articles which does not result in cracking.

It is a further object of our invention to provide an improved procedure wherein a predetermined amount of gaseous material is developed within a preliminary set or green product, that is, prior to firing the "green-bonded" article to result in ceramic maturation. As a consequence, we have provided a procedure for reducing to a minimum the amount of cracking during firing, thus effecting a reduction in the production of "seconds."

In accordance with the broad concept of our invention, a product is prepared from a slurry including a refractory material and an inorganic setting material which is capable of acting as a green bond to produce an initial set or solidification of the slurry, after the same has been molded into the desired shape by any conventional molding procedure. In addition to the bonding agent, another component of a slurry embodying the present invention is a product capable of generating a gaseous material as small bubbles distributed throughout the slurry and, hence, in the green bond. The slurry may contain, as a gas-yielding component, an inorganic peroxide of the class of hydrogen peroxide, alkali metal peroxides, and alkaline earth metal peroxides, or a suitable persalt capable of generating hydrogen peroxide in aqueous solution. As later more fully stated, a decomposing agent for the peroxide also is present.

Figure 2:
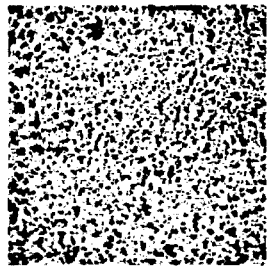

The accompanying drawing shows, in Fig. 1, a photo-micrographic cross-section of a cellular product which was prepared by the prior destructive distillation method heretofore described and, in Fig. 2, a photo-micrographic cross-section of a product embodying the present invention.

The refractory component may be selected in accordance with the properties desired for the final product and may consist of the generally used refractories such as silica, alumina, or the refractory silicates, as for instance, zirconium silicate or refractory clays. To the chosen refractory is added water and a setting agent as, for example, a minor amount of calcined gypsum. These components are proportioned in quantity to produce a plastic mix capable of being preformed into the desired shape as by casting, molding, ramming or other conventional shaping procedure. In general, the gas-yielding material employed will be hydrogen peroxide. It may be added at a suitable time to the mixture before the setting agent has solidified. For example, after the slurry has been made and while it still is semi-liquid or plastic, a suitable amount of aqueous solution of hydrogen peroxide is mixed uniformly therewith and then the peroxide is decomposed catalytically into oxygen and water. By reason of the uniformity of distribution of the peroxide, the evolution of oxygen gas proceeds in uniform fashion throughout the body of the aqueous plastic or semi-solid slurry. Gas evolution should be complete prior to the time that the calcined gypsum takes its initial set. This operation may be performed at approximately room temperature.

After the cast refractory has taken its initial set by the change of the calcined gypsum from the hemihydrate condition to the dihydrate condition, the molded articles are removed to a kiln where they are subjected to a temperature high enough to drive off water of hydration. A suitable temperature for such drying and baking is 230° F., but somewhat lower or higher temperatures may be used. The baked articles are subjected subsequently to a firing cycle, the temperature of which is sufficiently high and the duration of which is of sufficient length to induce ceramic sintering or vitrification of the mass as desired. The temperature of firing or maturation will depend upon the character of the component which is employed as refractory, and upon the properties desired in the finished article as is well understood in the manufacture of ceramic products. In some cases, a firing temperature of 1600° F. is suitable and, in other cases, a firing temperature of 2300° F. is employed.

The decomposition of the hydrogen peroxide should be completed prior to the time when the article is subjected to the ceramic firing and, therefore, the catalytic decomposition of the peroxide must be consummated within the short period of time required for the calcined gypsum to set, namely, a matter of a few minutes to a time as short as fractions of a minute. In order to properly accomplish such decomposition, it has been found that the inclusion at proper pH of small amounts of soluble inorganic salts are necessary. The salts chosen for this purpose may be the soluble salts of manganese, of cobalt, of iron, of nickel, and substantially any metallic salt capable of producing substantially instantaneous decomposition of hydrogen peroxide. Manganous salts, as for example manganous sulfate or chloride, will be found especially effective and desirable. In order to obtain substantially instantaneous evolution of gaseous oxygen from the pore-forming peroxide, the pH of the mixture should be above pH 8 and preferably in the range pH 8 to 10.

The relative proportion of clay or other chosen refractory material and gypsum, or other chosen hydrosetting material, is governed by the requirements. If high pre-firing strength is desired, a relatively high ratio of hydrosetting material is chosen. On the other hand, if a high degree of temperature-resistance or refractoriness is desired, a lower ratio of hydrosetting material and correspondingly higher ratio of ceramic material may be chosen. Two parts of ceramic material to one part of hydrosetting material by weight is a suitable ratio.

The amount of gas-evolving agent is determined by the porosity desired in the finished product. By weight (based on the weight of the clay), suitable limits are 0.1 to 0.4% of hydrogen peroxide. The decomposing agent, based on manganous sulfate with 4H₂O, may be chosen within limits of 0.05 to 0.25% by weight. Ordinarily the amounts of gas-evolving agent and decomposing agent are chosen to produce cavities of a diameter of 0.01" to 0.04" in the final product.

The following example is to be considered illustrative of the invention and is not to be deemed limitative thereof, as it will be understood that the amounts of ingredients and the ingredients themselves may be varied over relatively wide ranges, as pointed out, without departing from the spirit and scope of the invention.

In Table I, stating the ingredients in units of weight and volume, small scale units were chosen for illustrative purposes:

NO. 1

*Ingredients by weight and volume*

200 g. clay
100 g. gypsum
275 cc. water
5 cc. of an alkyl aryl sulfonate, such as Naccanol N. R. (10% solution)
2 cc. sodium hydroxide (10% solution)
2 cc. 100 vol. hydrogen peroxide
3 cc. Manganous sulfate (10% solution of crystals containing 4H₂O)

NO. 2

*Same ingredients wholly by weight*

200 parts clay
100 parts gypsum
285 parts water
0.5 parts of an alkyl aryl sulfonate, such as Nacconal N. R.
0.02 parts sodium hydroxide
2.2 parts hydrogen peroxide, 27.5% by weight, or 0.605 parts actual $H_2O_2$
0.3 parts manganous sulfate (4H₂O)

The weight of water in Table 2 includes water of solution.

The clay and gypsum are mixed intimately in the dry state by passage through a ball mill, although it will be understood that any other conventional form of mixing may be employed. The mixed products in the dry state are poured into a solution of sodium hydroxide in the amount of water specified, to which had been added a suitable wetting agent or introfier. A composition of alkyl aryl sulfonate may be used as a wetting agent, such as Nacconal N. R. Other known wetting agents, such as sulfates of long chain alcohols, may be used. In general, organic wetting agents are preferred to soaps. Mixing should be performed under constant stirring until a creamy consistency is obtained. Thereafter, the specified amount of hydrogen peroxide is added and thoroughly distributed throughout the mix. Lastly, the decomposition catalyst should be added. The volume of the mix expands as a foamy, plastic mass which may be formed, without delay, for example, by being cast into molds where the inorganic gypsum bond is permitted to set, thus entrapping the evolved oxygen and maintaining the green molded composition in porous form.

The molded article may be removed from the molds, transferred to a kiln and slowly heated to a suitable drying temperature, e. g., 212 to 230° F. and, in some cases, in the neighborhood of 300° F. When the baked articles are dry, the firing cycle is carried out. The temperature, for example, may be chosen as heretofore stated in the range of about 1600 to 2300° F. or higher, until ceramic sintering or fusion is complete.

Referring to the drawing which shows, in Fig. 1, a section of a porous ceramic product such as produced prior to our invention and which shows, in Fig. 2, a section of a product embodying our invention, it is apparent that a novel porous structure has been produced. The structure of the porous articles as heretofore produced, Fig. 1, contain numerous relatively large cavities and the structure of the composition surrounding the large cavities contains both disproportionately minute cavities and thick walls devoid of cavities.

The new product, Fig. 2, is finer grained and is filled with cavities of uniform size and distribution. The practical consequence of the improved structure are improved strength, less water-absorptiveness and excellent insulating and refractory properties.

What is claimed is:

1. A molding composition for the manufacture of ceramic ware comprising the combination by weight of about 200 parts of refractory clay, 100 parts of calcined gypsum, 300 parts of an aqueous solution containing about 0.10 to 0.40% of an inorganic peroxide and about 0.05 to 0.25% of a catalyst of decomposition for the peroxide, said solution also containing an introfier and sufficient alkali to produce a pH in the range of about 8 to 10.

2. A molding slurry for the production of cellular brick comprising the combination by weight of about 200 parts of refractory clay, about 100 parts of calcined gypsum and about 300 parts of an aqueous solution having a pH 8 to 10, and having dissolved therein about 0.3% of hydrogen peroxide, 0.15% of $MnSO_4 \cdot 4H_2O$, and about 0.25% of an introfier.

3. A method of fabricating ceramic cellular products which consists in forming a slurry consisting of an aqueous suspension of a refractory clay in major proportion, a calcined gypsum, an inorganic peroxide and an introfier, molding such slurry into desired form while charged with gas bubbles derived from said peroxide, drying the resulting solidified porous product and firing at elevated temperature to cause conversion of said refractory clay to a ceramic condition.

4. A method of making porous ceramic products which consists in forming a slurry containing as major components a refractory clay, calcined gypsum in amount less than the clay but sufficient to form a green bond therefor and water as a liquid suspending medium, said medium consisting of an aqueous solution containing about 0.20% of hydrogen peroxide, about 0.05 to 0.25% of a catalyst of decomposition for said peroxide, an introfier and sufficient alkali to result in a pH range of 8 to 10, causing said slurry to set in desired form while charged with gas bubbles derived by the decomposition of the hydrogen peroxide component, drying the resulting objects and thereupon firing said objects at a maturing temperature whereby a ceramic is produced.

5. A molding composition for the manufacture of porous ware comprising an aqueous suspension of a refractory clay in major amount, and calcined gypsum in minor amount, said suspension being alkaline and containing an inorganic peroxide, a catalyst of decomposition for the peroxide and an introfier.

HANS O. KAUFFMANN.
JAMES F. WHALEN, JR.

References Cited in the file of this patent

UNITED STATES PATENTS

| Number | Name | Date |
|---|---|---|
| Re. 17,523 | Ericson | Dec. 17, 1929 |
| 2,399,225 | Heany | Apr. 30, 1946 |

FOREIGN PATENTS

| Number | Country | Date |
|---|---|---|
| 315,205 | Great Britain | 1929 |
| 363,192 | Great Britain | 1931 |
| 539,022 | Great Britain | 1941 |
| 129,784 | Austria | 1932 |